United States Patent [19]

Allison et al.

[11] Patent Number: 5,731,765
[45] Date of Patent: Mar. 24, 1998

[54] MAINS SIGNALLING SYSTEMS

[75] Inventors: Robert Joseph Allison, Basingstoke; Paul Martin Moore, Mickleover; David Roger Scholefield, Winchester, all of United Kingdom

[73] Assignee: Remote Metering Systems, Ltd., Hants, Great Britain

[21] Appl. No.: 647,940

[22] PCT Filed: Sep. 27, 1995

[86] PCT No.: PCT/GB95/02292

§ 371 Date: May 30, 1996

§ 102(e) Date: May 30, 1996

[87] PCT Pub. No.: WO96/10860

PCT Pub. Date: Apr. 11, 1996

[30] Foreign Application Priority Data

Sep. 30, 1994 [GB] United Kingdom ............ 9419807

[51] Int. Cl.$^6$ ........................................ G08C 15/06
[52] U.S. Cl. ........................ 340/870.03; 340/870.09; 340/538; 340/310.06
[58] Field of Search ................. 340/870.02, 870.03, 340/870.16, 870.3, 825.07, 825.73, 506, 538, 310.01, 310.02, 310.06, 870.11, 870.12, 870.13, 870.09, 870.26

[56] References Cited

U.S. PATENT DOCUMENTS

| | | | |
|---|---|---|---|
| 4,337,466 | 6/1982 | Spahn | 340/870.09 |
| 4,446,458 | 5/1984 | Cook | 340/825.06 |
| 4,446,462 | 5/1984 | Ouellette et al. | 340/825.07 |
| 4,804,957 | 2/1989 | Selph et al. | 340/870.03 |

FOREIGN PATENT DOCUMENTS

| | | |
|---|---|---|
| A0178804 | 4/1986 | European Pat. Off. |
| A0258920 | 3/1988 | European Pat. Off. |
| A0395494 | 10/1990 | European Pat. Off. |
| WOA8102960 | 10/1981 | WIPO |

Primary Examiner—Jeffery Hofsass
Assistant Examiner—Andrew Hill
Attorney, Agent, or Firm—Lowe, Price, LeBlanc & Becker

[57] ABSTRACT

A remote electricity metering system utilizes a central station (LC) to communicate with meters (U1–U13) over the mains (10–14), with messages to remote meters being relayed by intermediate meters and the route of a message being determined by the central station. The present invention provides alarm signalling whereby the meters can communicate directly with the central station. Each meter can generate a respective combination of alarm frequencies, preferably sequentially and inside the frequency band used for normal messaging, and the local controller monitors the mains for those frequencies. An error detecting and/or correcting code can be used for the alarm frequency combinations. The central station polls the meter or meters sending the alarm. The meters are microprocessor based, with the normal message signals and the alarm frequencies being synthesized from a sequence of digital values by a D/A converter.

13 Claims, 2 Drawing Sheets

5,731,765

MAINS SIGNALLING SYSTEMS

The present invention relates primarily to mains signalling systems, though it is also applicable to other systems having similar characteristics. (The term "mains" applies primarily to the final consumer voltage portions of an electricity supply network, though the signalling can also extend over the higher voltage distribution parts of the network.) Such signalling is termed mains, mainsborne, or power line carrier (PLC) signalling.

REMOTE METERING

A major application of mains signalling is remote meter reading, operated by electricity generating and distribution companies (electricity utilities). The term "remote meter reading" refers to what is normally the major function of such systems, but they may also be concerned more generally with load and system control. Also, while they will usually be concerned primarily with electricity meters, gas and other meters can in principle be coupled to the mains for this purpose (preferably through electricity meters).

A typical simple remote meter reading system will have a central station or local controller (which can conveniently be located at a distribution transformer) which communicates over the mains with the meters (meter stations) of the various premises (largely household or domestic and small commercial) on the mains.

Such systems normally use some form of frequency modulation (in the broad sense). There is in fact an international standard now for such signalling, using frequencies in the general region of 3–150 kHz. (The standard is CENELEC EN50065.1, which specifies that frequencies in the band 3–148.5 kHz are available for signalling on low voltage electrical installations. This bandwidth is divided into several smaller bands with various uses and permissions associated with them; for example, the 9–95 kHz band is reserved for electricity suppliers and their licencees.)

Any suitable form of signalling can be chosen within that standard. One convenient form is FSK (frequency shift keying), in which information is transmitted by switching between two predetermined frequencies. This requires suitable signal generators and detectors.

The meters will normally be microprocessor-based. With such a meter, a convenient technique for signal generation is to use a digital-to-analog converter which is driven by a sequence of values defining a sine wave, obtained e.g. by reading them from a memory at a suitable rate; the signal frequency can be controlled by varying the reading rate. Good control of the waveform can readily be achieved, using say 8-bit words, say 128 or 256 samples defining a quarter-wave, and division down from say a 10 MHz clock. Signal detection requires detection of the two signalling frequencies. This can be achieved by providing fixed tuned circuits; alternatively, integrated circuits are available which are designed for such frequency signal detection.

Mains signalling systems have two major problems: noise and attenuation.

Mains noise arises from loads being switched on and off and the inherent characteristics of certain types of loads. The noise problem can generally be overcome by a variety of known techniques, such as error detection and correction techniques, requiring acknowledgement of reception, and repetition of lost messages. (Some of these techniques also deal with problems of message collision.)

Dissipation or attenuation at the preferred signal frequencies is significant; it is dependent on the particular operating conditions of the mains network and varies according for example to the loading of the network. The attenuation will often be irregular; there may for example be "dead spots", due e.g. to signal reflections, close to the signal source while communication to more distant locations is still reasonably reliable.

A system which largely overcomes these problems has been proposed in our earlier patent application no. PCT/GB94/01391, WO 95/01030. In that system, which we will for convenience call the "standard system", substantially all meters have a repeater function. The present system is a broadly a development of or improvement on that system.

The topology of the standard system will normally be branched. That is, the central station will normally communicate directly with several meters, each of those will normally communicate with several further meters, and so on. (The topology of the communication system is somewhat abstract, and must be distinguished from the physical or network topology of the mains network which supports the communication system. We will normally be concerned with the former, and will use the term "topology" alone for the former.)

A major feature of the standard system is that the message routing—is the determination of the routes which messages take through the network—is determined substantially entirely by the central station. This is the only station with any significant knowledge of the topology of the system, and is also the only station which can initiate a message.

The central station includes, in each message, a route in the form of a meter list—a list of the meters through which the message is to pass. To read a meter (or otherwise communicate with it), the central station sends out a message to the meter, which inserts its reading into the message and sends it back to the central station. For present purposes, the route—the meter list—can be taken as remaining unchanged in the message throughout the message's journey to the destination meter and back again to the central station. (In fact, the standard system preferably uses slight variations on this.)

The standard system can determine the topology of the system by means of search messages, and can readily be made adaptive to changes of topology. This is particularly important for mains meter reading. The transmission characteristics of the mains network are liable to change (over time periods of the order of minutes to hours). Also, there will be occasional changes in the number and locations of the meters of the system, and the mains network itself may be extended or modified over time. All these types of changes will change the topology of the system.

The local controller may find difficulty in communicating with a meter; it may get no response after several re-sends, or it may have to re-send for most messages to that meter. In that case, it uses the its knowledge of the topology to try to find an alternative route to the meter. Various techniques for route selection are described in the standard system, and a further technique is described in our copending application GB 94.16688, filed 18 Aug. 1994.

ALARM SIGNALLING

There are various situations where it is desirable for a meter to be able to inform the local controller urgently of some condition at the meter. The condition of interest may be some condition arising from the operation of the electricity utilization system in the premises served by the meter, or it may be some extraneous condition which is signalled to the meter either automatically by some apparatus coupled to it or by a user. Such signals may for example be alarm signals, e.g. from a burglar alarm system or from an emergency control operable by the user. For convenience, we will term all such signals alarm signals.

It is obviously important for such alarm signals to reach the local controller promptly. However, in the standard system, communication is strictly one-way, in the sense that the only unit which can initiate messaging is the local controller. The meters cannot initiate any messages; they can only respond to messages originating from the local controller.

In a small network, the standard system can be adapted to accommodate alarm signals by the local controller polling all meters on a regular basis. Provided the network is small enough, the polling cycle (ie the time required for all meters to be polled) will be short, and a meter with an alarm condition can merely wait until it is polled and then report the alarm condition in the return message. With a large network, however, the polling cycle may be too long for this technique to be satisfactory. Some other technique is therefore required.

One approach is to enable each meter to initiate a message when an alarm condition occurs. However, this involves difficulties in ensuring that the message will reach the local controller.

As discussed above, each message includes a meter list which defines its route through the system. In the basic form of the standard system, this meter list is maintained unchanged throughout the life of the message. (It is pointed out in the description of the standard system that addresses can be dropped from the meter list on the return journey of the message from the meter back to the local controller.)

For meters to be able to send alarm messages to the local controller, each meter must retain this address list, and insert it in any alarm message. But in a large system, the polling period (ie the period between successive messages to a given meter) may be substantial, and it may be desirable for the message frequency to different meters to be different, which will further increase the effective polling period for some meters. The address list held in a meter may therefore be old and so no longer valid when the alarm condition occurs, so the reliability of this technique is unacceptably low for many applications.

Further, such alarm messages may fail to reach the local controller as a result of transient noise or of collision with some different message also passing through the network (from the local controller to some other meter or back from that meter to the local controller). The alarmed meter must therefore incorporate some mechanism for repeating the alarm message, and it is difficult to set the delay in that mechanism. If the delay is less than than the time taken for the alarm message to reach the local controller plus the same time for the response message to reach the meter from the local controller, the repeat of the alarm signal is liable to collide with that response signal. But for a meter which is distant from the local controller, this delay becomes inconveniently large.

A further variant of routing control is also described in the standard system, where addresses are deleted one by one from the meter list in the message on its outbound journey and retained in the meters through which the message passes. On the return journey of the message, each meter though which it passes uses the retained address to forward the message to the next meter on its return journey to the local controller. If this variant is in use, alarm message routing can use the addresses stored in the meters (one per meter) which are already present.

However, the reliability of alarm message routing is still unsatisfactory with this variant. Although meters close to the local controller will have recent, and hence reasonably reliable, return route addresses, the reliability of the return addresses in meters at the end of long (multi-hop) paths will be little better than before.

A possible solution to this problem of reliability is for alarm messages to be broadcast rather than following strictly defined paths to the local controller. However, this causes further problems. In particular, excessive multiplication of copies of the alarm message is likely to occur as it spreads through the system. Some means must be provided for limiting this multiplication and eventually quenching of the number of copies of the message, and multiple copies of the message may result in frequent collisions and hence delay the transmission of the message.

The object of the present invention is to provide an improved method of alarm signalling in the standard system.

THE PRESENT INVENTION

According to the present invention there is provided a standard system or the like wherein the local controller includes means for monitoring the mains for a set of alarm frequencies and each meter includes means for generating a respective combination of those frequencies.

As noted above, the meters are preferably microprocessor-based, with the normal message signals being synthesized from a sequence of digital values by a digital-to-analog converter. Such a frequency synthesizer can of course be used to generate the alarm frequencies. The present alarm system thus requires no additions to or modifications of the hardware of the meters; all that is required is a modification to the program stored therein.

It is possible for the meter to generate a simultaneous combination of alarm frequencies, by synthesizing a combined waveform for all the frequencies. However, it is simpler and more convenient for the frequencies to be generated sequentially. This option (sequential frequencies) will be assumed from here on.

When the local controller detects frequencies in the set of alarm frequencies, it can determine, from the particular combination of frequencies detected, which meter has the alarm condition. It preferably then interrupts normal messaging and attends to the alarm condition by sending a message to the alarmed meter, so that that meter knows that its alarm has been received. The alarmed meter will normally insert more detailed information about the alarm into the message for return to the local controller.

It will be noticed that the alarm signalling from the meters to the local controllers is direct; there is no relaying of the alarm frequency signals. This is in contrast to the normal messaging, where relaying over several hops may be required. Normal messaging involves bit rates which may be in the region of 15 kHz, and signal attenuation can easily reduce such signals to levels below those at which they can be reliably detected. When a meter has an alarm condition, however, it emits its particular sequential combination of frequencies, as continuous tones. Although these signals are similarly attenuated, their attenuation is unlikely to be be complete. The local controller need only detect the presence or absence of these tones, and can effectively integrate the signals over long periods, of the order of 1 s.

Obviously the size of the network to which the present alarm system can be applied is not unlimited. However, we have found that in practice, the present alarm system works satisfactorily for networks of all reasonable sizes.

The bit rate of normal messaging may be fairly high, up to say 15 kHz. The bandwidth required for normal messaging is therefore at least 15 kHz. (It may be considerably larger, since, in simple systems, the messaging may generate various harmonics, and reasonable margins must be allowed for tolerances, etc.) For the single tones used for alarm signalling, however, the bandwidth is very much less, of the order of 100 Hz for each alarm frequency.

The bandwidth ratio between the two signalling systems may thus approach something in the region of 1000 for each alarm frequency individually. Assuming that the noise in the system is roughly white, this means that the alarm signalling system will withstand attenuations getting on for 1000 times the tolerable attenuation of the normal messaging system. This means that there will be no difficulty is detecting the alarm tones and distinguishing them from the normal messaging signals. (In other words, the alarm tones will effectively propagate several times as far through the network as the normal messages before reaching the limit of detectability, as noted above.)

A significant feature of the present alarm signalling system is that it can use the same frequency band as the normal messaging. This means that any other mains signalling systems are unaffected. The detection of the alarm frequencies will not be significantly affected by the presence of normal messaging signals, because the amount of messaging signal energy within any single narrow alarm frequency band is small. In other words, the system can discriminate adequately between normal messaging signals and alarm signals even though they occupy the same (broad) frequency band.

Normal message signalling uses frequencies typically in the region of 50 to 100 kHz and, as discussed above, uses a bandwidth typically in the region of 50 kHz. A bandwidth of 100 Hz for each alarm frequency is equivalent to a minimum separation of 100 Hz between adjacent alarm frequencies. Allowing for guard bands to separate the alarm frequencies and keeping the total alarm frequency band in the central region of the signalling frequency band, the number of alarm frequencies will thus typically be in the region of 100. By using sequences of 3 frequencies, in principle this therefore allows $10^6$ meters to be uniquely identified. This is more than adequate for even a large system, which may have some thousands of meters.

However, it is undesirable for a meter to use the same frequency twice in its alarm sequence. With a single frequency, there is a slight danger of a freak total attenuation of the alarm frequency signal between the meter and the local controller. With 3 frequencies, the chance of such a freak total attenuation occurring for all frequencies is negligible. Of course, if the local controller does not detect all the alarm signal frequencies, it will not be able to identify the meter uniquely. However, from the frequency or frequencies which it does detect, it will be able to effect a partial identification, and it can then poll those meters which have the detected frequency or frequencies to discover which of them has an alarm condition.

If desired, the sequences of frequencies assigned to the meters may be assigned according to an error detecting or correcting code, chosen to enable missing frequencies to be detected and/or corrected.

Although the sequences of frequencies assigned to the meters are distinctive of the meters, they need not necessarily be unique; two or more meters may share the same combination of frequencies. When the local controller detects such a particular combination of alarm frequencies, it will then have to poll the meters with that particular combination to discover which of them has the alarm condition. (Preferably it polls the entire group of meters with that combination, just in case more than one of them has an alarm condition.)

The local controller must monitor the mains network continuously for all frequencies of the set used for alarm signalling. This requires fairly elaborate circuitry. It will be realized, however, that a single local controller may monitor well over 1000 meters. The cost of the monitoring circuitry in the local controller is therefore only a very small fraction of the total cost of the system.

The present alarm signalling system can also be adapted for general background monitoring of the transmission characteristics of the mains system.

SPECIFIC EMBODIMENT

A remote meter reading system embodying the invention will now be described, by way of example, with reference to the drawings, in which.

THE STANDARD SYSTEM

Figure 1:
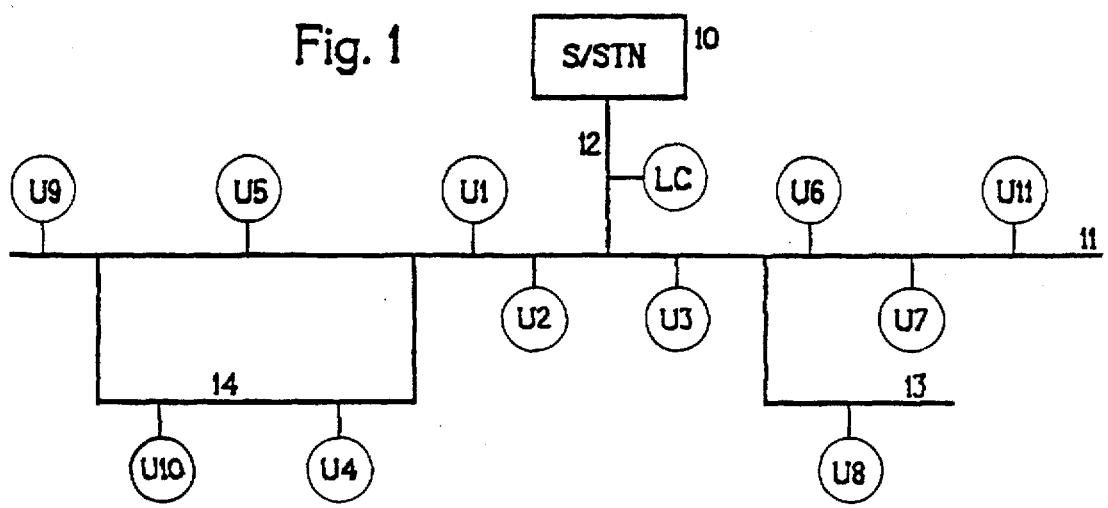
FIG. 1 shows a mains power distribution network and metering system.

FIG. 1 shows a mains network powered from a substation 10. The network comprises a main branch 11 connected to the substation 10 via a line 12, a second branch 13, and a loop branch 14. A central station (local controller) LC is connected to the network adjacent to the substation 10, and various user consumption meters U1–U11 are connected throughout the network as shown. All the meters can also act as relay units. In practice, the mains network will typically extend over an area of the order of 1 km in diameter, and the number of meters will typically be in the region of 100 to 1000.

Figure 2:
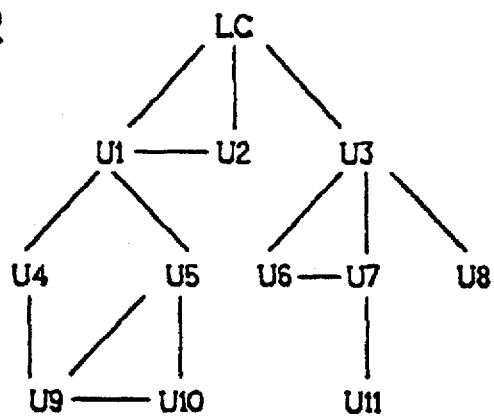
FIG. 2 shows the topology of the FIG. 1 system.

FIG. 2 shows a typical topology for this network. The local controller LC can communicate with meters U1–U3; meter U1 can communicate onwards with meters U4 and U5; and so on. This tree corresponds roughly with the physical closeness of the meters in the physical network of FIG. 1, but the correspondence will in general not be exact. In practice, the maximum path length, ie the maximum number of hops required for the local controller to reach a meter, will typically be 3 or 4. In some systems, however, the number of hops required to reach the most remote meter may be considerably greater than that.

To read the contents of a meter or to control it, the local controller sends a message to the meter, and the meter returns the message suitably modified. The message format comprises three main fields; a command field, a route field, and a data field.

The route field defines the path which the message is to take through the system from the local controller to the meter and back again, and comprises a control subfield and a meter list—a sequence of meter addresses defining that path. The control subfield includes a direction indicator (e.g. O for outbound and I for inbound), a meter list length, and a marker which is effectively moved along the meter list as the message moves through the system to indicate the next meter which is to receive it as the message passes through the system.

Thus for a message being sent to meter U7, for example, the data path field will initially consist of a control subfield O-3-2 and a meter list LC-U3-U7. In the control subfield, the first character, O, indicates that the message is an outbound one, the second is the label sequence length, and the third is the pointer. The following table summarizes the progress of the message:

|    |     |     |     |
|----|-----|-----|-----|
| 1: | LC  | →U3 | U7  |
| 2: | LC  | U3  | →U7 |
| 3: | LC  | U3← | U7  |
| 4: | LC← | U3  | U7  |

This shows the four stages in the outward and return journeys of the message, with an arrow in place of the control subfield to indicate both the active address and the direction of travel. At each stage, the message will normally be received by several stations, but only the station which matches the active address accepts and (except for the local controller) retransmits it.

ALARM SIGNALLING

The normal messaging system thus has a complicated topology (FIG. 2), and message transmission frequently involves relaying over multiple hops. In contrast, the alarm system has a simple topology in which all meters are coupled directly to the local controller.

METER

Figure 3:
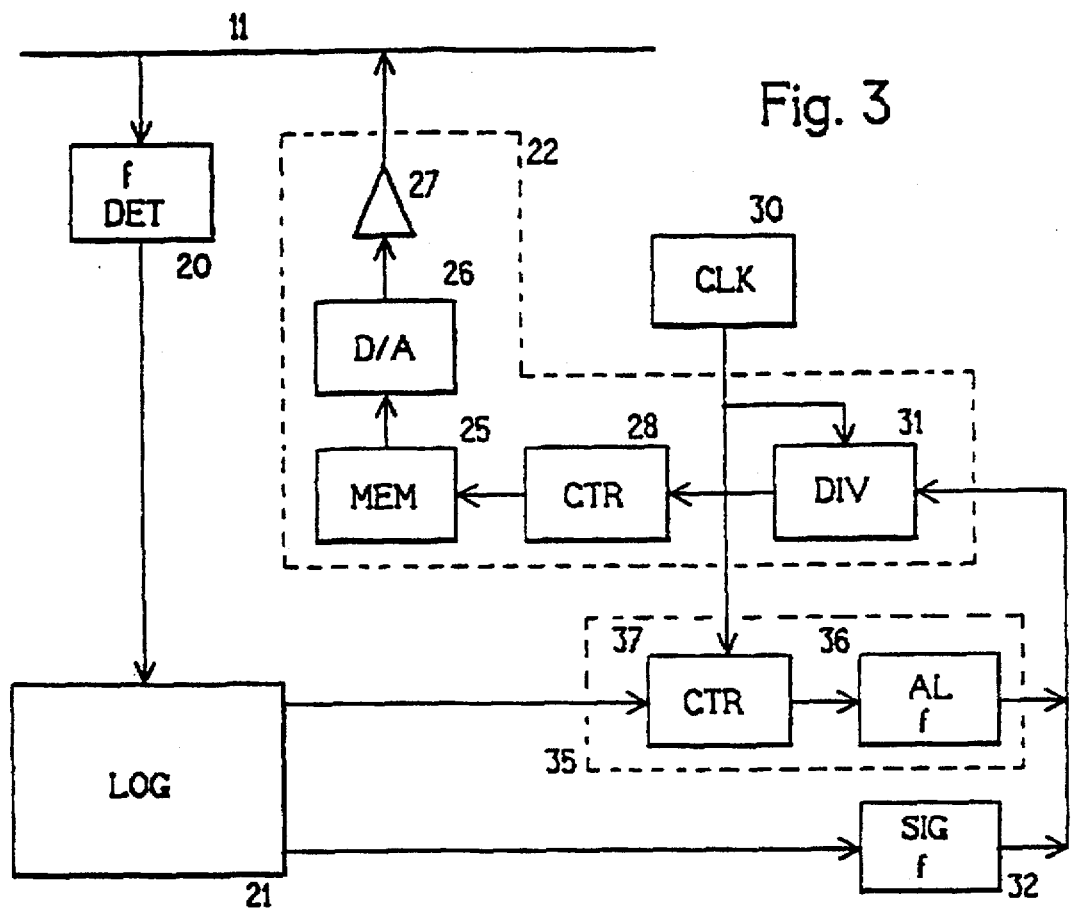
FIG. 3 is a simplified block diagram of a meter of the FIG. 1 system.

FIG. 3 is a block diagram of a typical meter 10. This is coupled to the mains network 11 to both receive signals from it and transmit signals to it. For receiving signals, there is a frequency detector 21, which is fed from the mains and coupled to logic circuitry shown as a general logic block 21. For transmitting signals, there is a transmitter unit 22 which is driven from the logic block 20 and drives the mains.

The transmitter unit 22 includes a memory 25 coupled to a digital-to-analog converter 26 which drives a driver amplifier 27 which feeds the mains. The memory 25 contains a stored sequence of values representing a sine wave; there may for example be 512 storage locations each containing an 8-bit value. The memory is driven by a scale-of-512 counter 28, which cyclically reads out its contents. The D/A converter 26 will thus synthesize a sine wave of a frequency equal to that of the cycle period of counter 28.

In practice, this basic technique will be modified by minor improvements. For example, smoothing may be applied to the D/A output; there may be a level shift between the D/A converter and the driver 27, to convert positive signals to signals with a zero voltage mean; the memory 25 may contain only a quarter-wave set of values, with the counter 28 counting up and down alternately, and with a switched inverter included to generate the negative-going sine wave half-cycles; and so on. These details are not of particular importance for present purposes.

A clock signal generator 30 such as a crystal oscillator generates clock pulses at a high frequency (e.g. 10 MHz). These are divided down by a settable divider 31 to produce the counting pulses which drive the counter 28. The division rate of the divider 31 is determined by a rate value sent to it.

For normal message signalling, the logic unit 21 generates a bit stream which is fed to a signal frequency selector unit 32. Unit 32 contains two pre-stored frequency values which are passed to the variable frequency divider 31 at the appropriate times to cause the transmitter unit 22 to generate the desired FSK signals which carry the bit stream coming from the logic unit 21. The two signal frequency values stored in the signal frequency selector unit 32 are common to all meters. (When the logic unit 21 is not sending a message, the transmitter unit is put into a quiescent state in which its output is steady.)

For alarm signalling, the logic unit 21 sends an alarm signal to an alarm control unit 35. This includes an alarm frequency selector unit 36, which contains three pre-stored frequency values. A counter 37 is initiated by the signal from the logic unit 21, and selects the three alarm frequency values in sequence; after that sequence, the transmitter unit is put into the quiescent state. Thus on an alarm, the transmitter unit sends out the sequence of alarm frequencies.

The three alarm frequency values stored in the alarm frequency selector 36 form a sequence which is distinctive of the particular meter. Further, the count rate of the alarm counter 37 is slow enough to hold each of the three alarm frequencies steady for a time which is at a minimum the inverse of the accuracy with which the alarm frequencies are defined, and is preferably very considerably more. Thus for a frequency band for each alarm signal of 100 Hz, as discussed above, the minimum time for which each alarm frequency must be generated is 0.01 s. To allow the local controller to integrate its detection of alarm signals, however, each alarm frequency is preferably generated for at least an order of magnitude longer than this; a convenient time is between 0.1 and 1 s.

The meter is preferably microprocessor-based, and many of the components described may be implemented by suitable microprocessor techniques.

LOCAL CONTROLLER

Figure 4:
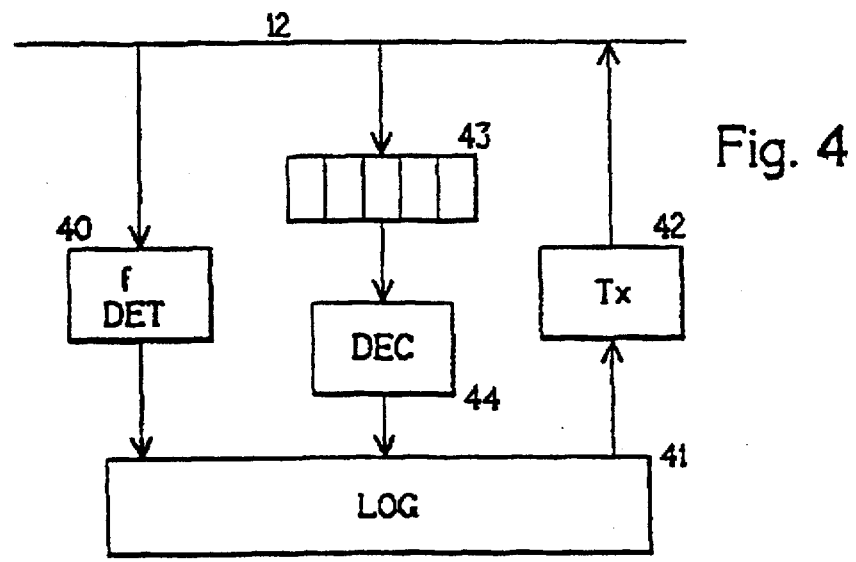
FIG. 4 is a simplified block diagram of the local controller of the FIG. 1 system.

FIG. 4 is a block diagram of the local controller LC. This includes a logic unit 41, which is coupled to the mains network 12 via a frequency detector 40 and a transmitter unit 42 (similar to the frequency detector 20 and the transmitter unit 22 of the meters). These units allow the local controller to perform normal messaging. In addition, the local controller includes a multi-channel alarm frequency detector 43, which detects the alarm frequencies and passes the detected frequencies on to a decoder 44 which stores the frequency sequences of the meters and so identifies, from a received alarm frequency sequence, the meter which produces that sequence.

The requirements for the normal messaging signal frequency detector 40 and the alarm frequency detector 43 differ widely. The normal messaging signal frequency detector has to detect the two frequencies of the FSK system at a rate which matches the bit rate (up to 15 kHz), and its discrimination has to be adequate only to distinguish between the two message signal frequencies at relatively high signal levels. The alarm frequency detector 43 has to detect and discriminate between a large number of frequencies with high accuracy, and preferably also includes integrating (accumulator) means for integrating the received signals over periods typically between 0.1 and 1 s so that it can detect alarm signals at low (near noise) signal levels. The two frequency detectors are therefore in practice separate units.

The alarm frequency detector 43 may for example comprise of a set of tuned circuits or a frequency analyzer, or it may be implemented digitally, e.g. by means of a fast Fourier transform unit.

MULTIPLE ALARMS

It may happen that two or more meters generate alarms simultaneously. The local controller is preferably designed so that it can cope with at least some such situations.

One of the alarm frequencies of a particular sequence may be almost completely attenuated at the local controller. As noted above, this situation can be dealt with by the local controller determining which meters have sequences including those alarm frequencies which have been detected and polling them. (This is of course not a true multiple alarm situation.)

Assuming that an alarm sequence consists of 3 successive frequencies, this can be represented as 1-1-1, where each number indicates the number of frequencies detected for that time slot. If two such sequences overlap, then the result is likely to be 1-1-2-1-1, 1-2-2-1, or 2-2-2. Such sequences can clearly be analysed into their two component sequences, with little or no ambiguity for 1-1-2-1-1, perhaps a significant degree of ambiguity for 1-2-2-1, and possibly serious ambiguity for 2-2-2.

A sequence such as 1-2-1-1 can similarly be analysed, the 1 (in place of a 2) in the third place indicating that the third alarm frequency of the first sequence and the second alarm frequency of the second sequence are the same. Alternatively, the 1 in the third place may indicate that one of the frequencies which should have been detected was almost completely attenuated.

The alarm signal strengths can also be monitored, to assist in separating the two sequences of frequencies. If a sequence 1-2-2-1 is actually a sequence S-(S+W)-(S+W)-W, where S and W represent readily distinguishable signals strengths Strong and Weak, the two component sequences are probably S-S-S-0 and 0-W-W-W. However, the transmission characteristics of the mains network may be different for different frequencies, so the usefulness of this technique depends on how different the two signal strengths are and how different the various alarm frequencies are. Also, if the two sequences happen to have the same frequency in the same time slot, the signals from the two meters may combine additively or subtractively at the time slot.

Preferably, however, the period of each alarm frequency (ie the period for which it is generated) is several times the period over which it can be detected by the local controller. This allows the local controller not only to detect the occurrence of an alarm frequency but also to monitor how its amplitude varies over the time for which it is present.

Since the meters are not synchronized with each other, if two meters do send alarm signals together, their alarm frequency periods will normally start at different instants. So if two alarm frequency sequences overlap, the local controller will often be able to separate the two sequences by correlating the timings of different alarm frequency signals; those alarm frequencies whose timings are separated by exact multiples of the alarm frequency period are components of the same sequence of alarm frequencies.

The amplitude waveform (envelope) for a single alarm frequency should have the form of a square wave whose length is that of the alarm frequency period. If the envelope is found to be a somewhat irregular wave of length substantially greater than the normal length, it is probably the result of two separate alarm signals of the same frequency, and the two ends of the envelope can be taken as the two separate alarm signals from different meters. The local controller can thus also often cope with overlapping alarm sequences in which one (or more) frequencies are the same in the two sequences.

If some other alarm frequency has a well-shaped envelope, then it is probably from a single meter. The timing of this envelope can then be used to help to analyse an irregular envelope at some other alarm frequency.

If several alarm frequencies have been detected, then the possible meters from which they may have come can be determined, and those meters polled. This may be time-consuming, but the number of meters to be polled will normally be considerably fewer than the total number of meters in the system. If polling has to be performed, then it is preferably sequenced to poll the meters in order of increasing hop length. This does not affect the worst case (which is where the alarmed meter is the last one polled), but it does reduce the average time required to discover the alarmed meter.

There may of course be extreme situations in which alarm storms occur (ie where many alarms appear at the same time). It may not then be possible to identify the alarmed meters from an analysis of the alarm frequency signals. The present system is therefore unsuitable for use for e.g. home voting systems in which a large number of users vote (in response to say a television program) within a short time.

However, in alarm storms, the local controller can simply poll all the meters to discover which are alarmed. This may take a substantial time, typically, a few minutes, to complete. Although such a length of time is normally unacceptable for genuine alarm situations of the emergency type, it is likely to be tolerable for alarm storms because there will probably be insufficient resources to take satisfactory action to respond to all the alarms even when they have all been detected and identified properly. Also, there is likely to be a common cause for all (or nearly all) the alarms, and that can be identified from a single alarmed meter (if it can be identified from the meters at all).

MAINS SYSTEM MONITORING

The present alarm monitoring system can be adapted to monitor the general transmission characteristics of the mains distribution system as a background task. For this, a meter is chosen by the local controller and instructed to step through a full sequence of alarm frequencies; the sequence may be at a lower amplitude than for normal alarm signals, and may be repeated for successively lower amplitudes. The frequency analyser 43 detects these frequencies. By taking suitable meters in turn, the transmission characteristics of the mains system can be determined from the received amplitudes of the various detected frequencies. If a particular frequency has a particularly poor transmission characteristic from a particular meter, the combination of alarm frequencies assigned to that meter can then be chosen or modified to avoid that frequency.

We claim:

1. A remote metering system comprising a mains supply system having a local controller and a plurality of addressable consumer meter units with which the local controller communicates by sending messages for return by the addressed meter units, each message including a series of bits encoded in a frequency band above the mains frequency, messages from the local controller to distant ones of said meters being relayed via intermediate ones of said meter units, each meter unit including a source for generating a combination of alarm frequencies above the mains frequency, the combination of alarm frequencies being different for each of the meter units and having a frequency different from the frequencies associated with the encoded bits of the messages, the local controller including a monitoring arrangement for monitoring the mains for the combinations of alarm frequencies associated with the meter units.

2. A remote metering system according to claim 1, wherein the alarm frequencies are generated sequentially.

3. A remote metering system according to claim 1, wherein the alarm frequencies are inside a frequency band used for normal messaging between the local controller and the meter units.

4. A remote metering system according to claim 1, wherein the combination of alarm frequencies derived by each of the meter units includes three distinct frequencies.

5. A remote metering system according to claim 1, wherein the local controller includes: a decoder for decoding the combination of alarm frequencies to identify the meter originating the alarm and a polling unit for polling those meter units which have the detected frequency or frequencies to discover which of them has an alarm condition in response to the decoder failing to identify the meter unit originating the alarm.

6. A remote metering system according to claim 1, wherein the combinations of frequencies assigned to the meter units are assigned according to an error detecting or correcting code, chosen to enable missing frequencies to be detected and/or corrected.

7. A remote metering system according to claim 1, wherein each of the meter units includes a microprocessor including a digital to analog converter for synthesizing normal message signals and the alarm frequencies from a sequence of digital values.

8. A remote metering system according to claim 1, wherein the local controller responds to frequencies in the set of alarm frequencies to interrupt normal messaging and sends an indication of the alarm condition to the alarmed meter unit via the mains.

9. The remote metering system of claim 8 wherein the indication of the alarm condition is signalled by the series of bits encoded in the frequency band above the mains frequency.

10. A remote metering system according to claim 1, wherein the local controller includes a unit for instructing a meter unit to step through a full range of alarm frequencies and includes a unit for monitoring the strength of the received alarm signals.

11. A method of signalling in a remote metering system connected to a mains supply system, the remote metering system having a local controller and at least several addressable consumer meter units connected to each other by the mains supply system such that the mains supply system connects a first of the consumer meter units to the controller via a second of the consumer meter units, the first consumer meter units including an alarm detector, the method comprising sending a first message from the controller to the first consumer meter unit via the mains system through the second consumer meter unit, the first message including a series of address bits, the first consumer meter unit having an address frequency encoded in a frequency band above the mains frequency, the first consumer meter unit responding to the frequency encoded address bits associated with the address of the first consumer meter unit by deriving a second message indicative of non-alarm information at the first consumer meter unit, the second message including a series of information bits associated with the non-alarm information at the first consumer meter unit, the information bits associated with the non-alarm information at the first consumer meter unit being frequency encoded in the frequency band above the mains frequency, sending the second message from the first consumer meter unit the local controller via the mains system through the second consumer meter unit, the first consumer meter unit responding to the alarm detector by generating a combination of alarm frequencies above the mains frequency, the combination of alarm frequencies being different for each of the meter units and having a frequency different from the frequencies associated with the frequency encoded bits of the messages, the local controller monitoring the mains for the combinations of alarm frequencies associated with the meter units and the frequencies of the frequency encoded bits in the second message, the local controller activating an alarm to signal that the second unit has detected an alarm in response to the combination of alarm frequencies associated with the second unit being monitored by the local controller and responding to the frequency encoded bits of the second signal to derive an indication of the non-alarm information at the first consumer unit.

12. An addressable consumer meter unit in a remote metering system connected to a mains supply system having a local controller and at least several addressable consumer meter units connected to each other by the mains supply system such that the mains supply system connects a first of the consumer meter units to the controller via a second of the consumer meter units, the controller sending a first message to the first consumer meter unit via the mains system through the second consumer meter unit, the first message including a series of frequency encoded address bits associated with the address of the first consumer meter unit and encoded in a frequency band above the mains frequency, the unit comprising an alarm detector, a source of bits indicative of non-alarm information at the unit, a source of plural frequencies, the source of plural frequencies responding to the source of bits indicative of non-alarm information at the unit to derive different encoded frequencies representing different non-alarm information bit values in response to the unit receiving via the mains system the encoded address bits associated with the unit and supplying the derived different encoded frequencies representing the different non-alarm information bits to the mains supply system for transmission to the controller, the derived different frequencies being at a frequency greater than the mains frequency, a source of multiple frequencies having a combination of frequencies greater than the mains frequency and different from the plural encoded frequencies, the source of multiple frequencies responding to the alarm detector to supply the combination of frequencies to the mains supply system for transmission to the controller.

13. A local controller in a remote metering system connected to a mains supply system having a local controller and at least several addressable consumer meter units connected to each other by the mains supply system such that the mains supply system connects a first of the consumer meter units to the controller via a second of the consumer meter units, each of the consumer meter units including an alarm detector and a source for generating a combination of alarm frequencies above the mains frequency in response to the alarm detector detecting an alarm at the particular consumer unit, the combination of alarm frequencies being different for each of the consumer units, each of the consumer meter units including a detector for a series of address bits encoded in a frequency band above the mains frequency and coupled to the local controller via the mains system, each meter unit also including a source responsive to the frequency encoded bits associated with the unit being coupled to the unit via the mains system for deriving a series of bits frequency encoded in a frequency band above the mains frequency and containing non-alarm information about the metering unit, the local controller comprising a source for deriving messages to be sent via the mains system to the first metering unit via the second metering unit, some of the messages including a series of address bits for the first unit frequency encoded in a frequency band above the mains frequency, a detector for non-alarm information containing messages representing frequency encoded bits transmitted to the local controller from the consumer units via the mains systems, a detector for combinations of frequencies derived by the consumer unit indicative of an alarm condition being detected at each of the alarm units, and a signalling device responsive to the combinations of alarm frequencies transmitted to the local controller via the mains system for indicating the consumer unit that derived the alarm.

* * * * *